3,325,781
DUAL TRANSDUCER PROBE FOR ULTRASONIC TESTING
Robert V. Harris, Darien, Conn., assignor to Branson Instruments Incorporated, Stamford, Conn., a corporation of Delaware
Filed July 7, 1966, Ser. No. 563,573
8 Claims. (Cl. 340—15)

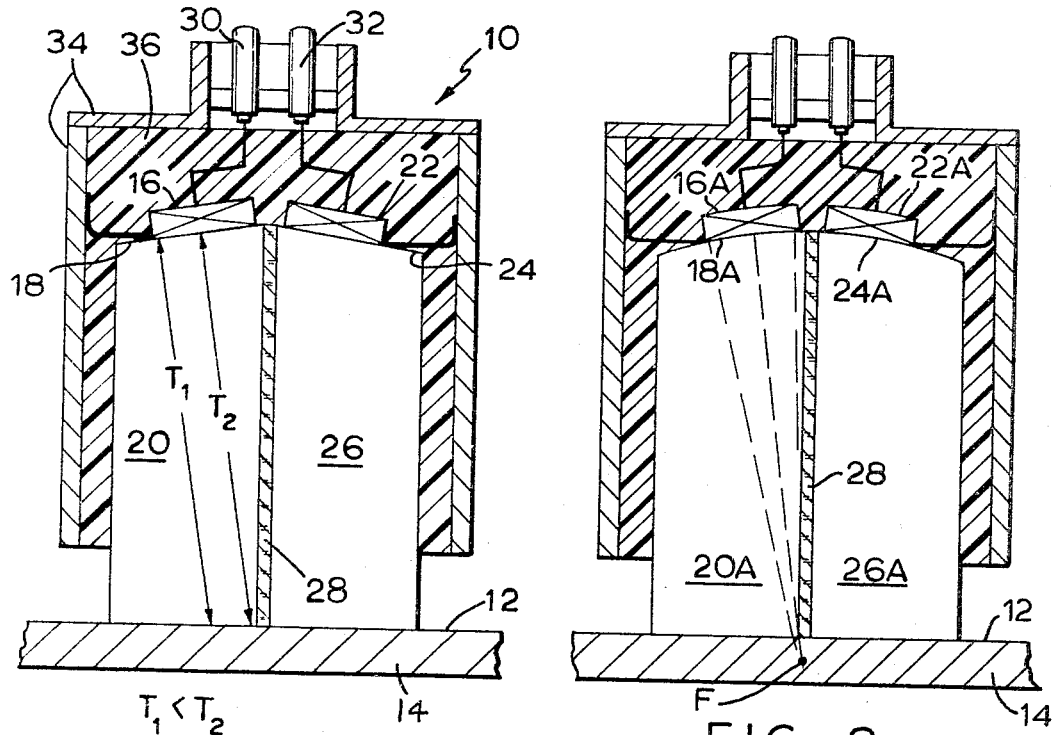
FIG. 1
FIG. 2
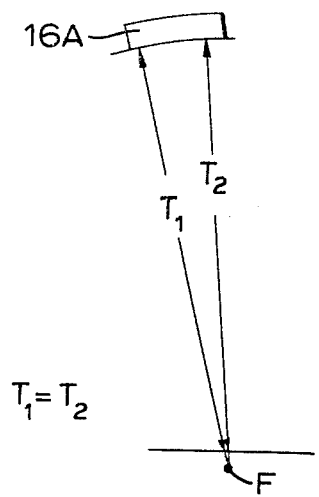
FIG. 3
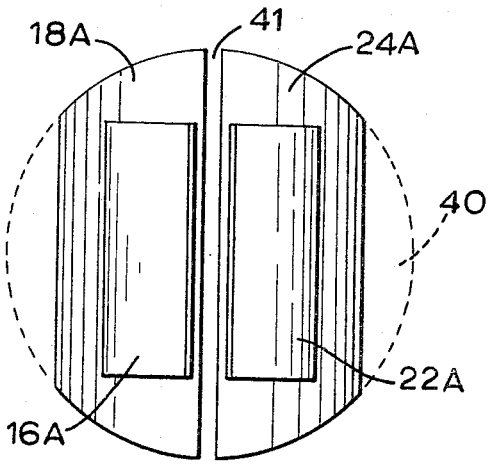
FIG. 4
ROBERT V. HARRIS
INVENTOR.

ABSTRACT OF THE DISCLOSURE

A dual transducer probe for pulse-echo ultrasonic testing comprising a pair of electro-acoustic transducers and an associated pair of elongated matching coupling means to form respectively a transmitter and receiver of ultrasonic energy. At least the transducer normally constituting the pulse transmitting means is mounted to a convex surface of the associated coupling means in order to provide substantially equal transit time for acoustic signals traversing said coupling means along the path between said transducer and the entrant surface of a workpiece to which the coupling means is coupled.

---

This invention generally concerns an electro-acoustic transducer probe and, more specifically, has reference to a dual transducer probe for ultrasonic pulse-echo testing. Quite specifically, this invention refers to an ultrasonic dual transducer probe which may be used advantageously in conjunction with the method and apparatus described in the copending application for U.S. Letters Patent entitled, "Ultrasonic Inspection Method and Apparatus," Ser. No. 532,037, filed Jan. 27, 1966, in the name of Kilian H. Brech, which application is assigned to the assignee of this application.

Dual transducer probes, that is, probes which have a separate ultrasonic signal sending and receiving means, mounted in side by side relation within a common housing, are well known in the prior art. Such transducers are used extensively for testing or gauging thin metal sections, or objects which exhibit a heavily corroded surface. When testing hot objects, a heat barrier is commonly interposed for protective purposes between the objects surface and the heat sensitive transducer element, usually piezoelectric material of the lead zirconate titanate or lithium sulfate kind. As synthetic materials have become available which withstand relatively high temperatures, yet conduct acoustic energy with relatively little loss, the previously used liquid coupling means have been replaced by solid coupling means, usually a short bar of thermoplastic material.

The present invention concerns the construction of a dual transducer probe which includes a solid coupling means, the piezoelectric transducer material being mounted on arcuate surfaces of the coupling means so as to obtain focused ultrasonic energy beams which enhance the accuracy with which ultrasonic testing can be performed. The beams are intersecting each other at a location slightly forward of the probe's frontal surface.

One of the principal objects of this invention is the provision of a new and improved dual transducer probe for ultrasonic testing.

Another and important object of this invention is the provision of a dual transducer probe for ultrasonic pulse-echo testing which avoids inaccuracies when performing ultrasonic pulse-echo gauging and testing.

A further object of this invention is the provision of a dual transducer probe which includes a solid coupling means for thermally insulating the transducer means from a hot object surface, the interposed coupling means and the transducer means being constructed to enhance the accuracy of measurement.

A still further object of this invention is the provision of a dual transducer probe which includes a solid coupling means whereby the solid coupling means is provided with arcuate surfaces to which the respective ultrasonic energy transmitting and receiving transducers are mounted in order to provide focused beams which provide enhanced accuracy for the ultrasonic testing and gauging.

Further and still other objects of this invention will be more clearly apparent by reference to the following description when taken in conjunction with the accompanying drawings, in which:

FIGURE 1 is an elevational view, partly in section, of the typical prior art construction;
FIGURE 2 is a view similar to FIGURE 1, but showing the improvement made by the present invention;
FIGURE 3 is an explanatory sketch; and
FIGURE 4 is a top view showing the procedure for fabricating the improved dual transducer probe.

Referring now to the figures and FIGURE 1 in particular, numeral 10 generally identifies a dual transducer probe which engages the surface 12 of an object 14 which is to be explored by ultrasonic energy.

The dual transducer probe includes a piezoelectric sending or transmitting transducer 16, a piezoelectric receiving transducer 22, and a pair of solid coupling means 20 and 26, the transducers being mounted to the respective rear surfaces 18 and 24 of the coupling means. Both coupling means 20 and 26, being in juxtaposition, are separated from one another by a narrow longitudinal gap which is filled with acoustic barrier material 28, such as cork, to suppress cross-coupling of acoustic signals.

The solid coupling means 20 and 26, in a typical embodiment, are bars of polyimide thermoplastic material, e.g. heat resistant material available under the trade name "Vespel SP-1" from the E. I. du Pont de Nemours & Company, Wilmington, Del. Such material is capable of withstanding high temperature, yet exhibits good ultrasonic signal transmission characteristics.

The transmitting transducer 16, a wafer of piezoelectric material, is connected by a suitable conductor attached to the top flat side thereof to a connector pin 30 and the receiver transducer 22 is connected similarly to a connector pin 32. The connector pins are held in a transducer enclosure 34 to which are connected also the respective opposite sides of the transducers 16 and 22. The space between the enclosure 34, the piezoelectric transducers and the solid coupling means is filled with a suitable potting compound 36, such as epoxy resin.

Dual transducer probes are constructed normally to provide a "focused" beam, that is, the respective acoustic beam axes are inclined with respect to one another so as to cause the acoustic beams to intersect one another in a focal plane slightly beyond the object entrant surface 12. To this end, as shown, the rear surfaces 18 and 24 of the coupling means 20 and 26 are inclined with respect to the respective front surfaces, causing the acoustic beam from the piezoelectric transmitter 16 to traverse the coupling means 20 and intersect the object's entrant surface 12 at an angle which deviates from 90 degrees. The same construction applies similarly to the receiver side of the probe. As shown, the piezoelectric elements 16 and 22 are mounted to plane, inclined rear surfaces of the coupling means. The above described construction is illustrated also in the book "Ultrasonic Engineering" by Julian R. Frederick, John Wiley & Sons, Inc., New York, N.Y. (1965), page 263, Figure 7.18.

When a well defined and distinct reflection signal responsive to the interface between the coupling means 20 and the object entrant surface 12 is required, as when testing thin metal sections, e.g. ¼ inch thickness or less, the construction shown in FIGURE 1 is not very suitable since the reflection signal is not well defined. The fault is inherent in the construction shown. The distance and consequently the signal transit time $T_1$ from the outside edge of the transmitting transducer 16 to the entrant surface 12 of the object 14 is less than the time $T_2$, which is the distance from the inner edge of the same transducer to the entrant surface 12. Hence, a distorted wave front occurs which cannot be used for accurate interface trigering.

FIGURE 2 shows the improved construction in accordance with the present invention. The rear surfaces 18A of the respective coupling means 20A is made to be arcuate, for instance forming a cylindrical section. This causes the acoustic energy beam portion originating at different lateral locations of the piezoelectric transducer 16A to traverse equal distances in the coupling means 20A and to come to a focus at the location F, as is shown in FIGURE 3. The location of F, in the preferred embodiment, is slightly beyond the frontal surface of the coupling means, directly in front of the inner edge of the coupling means 20A.

For attaining a distinct echo signal, the rear surface 24A of the coupling means 26A is curved similarly and the receiver transducer 22A attached thereto. In this way, a clear and distinct interface responsive signal and a distinct reflection signal is obtained. When the convex surfaces 18A and 24A form cylindrical sections, the beams meet in a focal plane. For improved sensitivity, the surfaces 18A and 24A may comprise spherical sections, in which case the beams come to a focus in a focal point. In the construction per FIGURE 2, the piezoelectric transducers 16A and 22A are shaped by grinding, or otherwise, to conform to the curvature of the respective surfaces 18A and 24A. This curvature is in contrast with the plane surfaces of the transducers 16 and 22 in FIGURE 1, the prior art.

FIGURE 4 illustrates the fabrication of the coupling means and of the transducer means. In a typical case, both coupling means 20A and 26A are made from a single piece of thermoplastic material one-half inch diameter round bar stock, approximately one-half inch long. The opposite longitudinal surfaces are then flattened by removing the dashed portions 40, as seen in FIGURE 4, and a slot 41 is cut through the center. Each of the coupling members 20A and 26A is then approximately three-eighth inch by one-quarter inch by one-half inch long. When the surfaces 18A and 24A are cylindrical sections, they are provided approximately with a 0.750 inch radius, the center of the radius being disposed substantially along the common longitudinal axis. The transducers 16A and 22A, made of piezoelectric material, are ground with a similar radius on both sides and bonded to the respective curved surfaces 18A and 24A of the coupling members 20A and 26A as is illustrated. The method of attaching the transducers to the coupling means, the making of electrical connections, embedding in resin, and other procedures of transducer fabrication are well understood and have been described and treated in the prior art.

While there has been described and illustrated a certain specific embodiment of this invention and several modifications have been indicated, it will be apparent to those skilled in the art, that various further changes and modifications may be made therein without deviating from the broad principle and intent of this invention, which shall be limited only by the scope of the appended claims.

What is claimed is:
1. A dual transducer probe comprising in combination:
   a pair of relatively elongated matching coupling means arranged in substantially parallel, juxtaposed and slightly spaced acoustically insulated relation, and each such means having a first end surface for supporting thereupon an electro-acoustic transducer and a second end surface, opposite said first end surface, arranged to be coupled to an entrant surface of a workpiece;
   one of said coupling means constituting essentially a transmitter of ultrasonic energy and the other constituting a receiver of ultrasonic energy;
   electro-acoustic transducers engaged respectively with each of said first end surfaces, said transducers adapted to act respectively as a transmitter and a receiver of acoustic energy pulses;
   the first surface of the coupling means constituting essentially the transmitting means being of convex shape to provide substantially equal amounts of transit time to acoustic pulses produced by said transmitting transducer and traversing said coupling means from different locations on said respective first surface to said opposite second surface whereby to provide a substantially well defined reflection signal responsive to the interface between said second surface and said workpiece entrant surface, and
   said convex shape being curved also to cause acoustic signals provided by said transducer and emanating from different locations along said respective first surface to be focused toward an area within the workpiece beyond the entrant surface thereof and toward a region in proximity to the central axis between said pair of coupling means.

2. A dual transducer probe as set forth in claim 1 wherein said pair of coupling means comprises bars of polymeric thermoplastic material, and the space between said coupling means is filled with an acoustic barrier material.

3. A dual transducer probe as set forth in claim 1 wherein said first surface of the coupling means constituting essentially the transmitting means is shaped to form a cylindrical section, the rotational axis of such section being disposed in proximity to said opposite second surface and in proximity to the central axis between said pair of coupling means.

4. A dual transducer probe as set forth in claim 1 wherein said first surface of the coupling means constituting essentially the transmitting means is shaped in the form of a spherical section, the center of such sphere being disposed in proximity to said second opposite surface and in proximity to the central axis between said pair of coupling means.

5. A dual transducer probe comprising in combination:
   a pair of relatively elongated matching coupling means arranged in substantially parallel, juxtaposed and slightly spaced acoustically insulated relation, and each such means having a first end surface for supporting thereupon an electro-acoustic transducer and a second end surface, opposite said first end surface, arranged to be coupled to an entrant surface of a workpiece;
   one of said coupling means constituting essentially a transmitter of ultrasonic energy and the other constituting a receiver of ultrasonic energy;
   electro-acoustic transducers engaged respectively with each of said first end surfaces, said transducers adapted to act respectively as a transmitter and a receiver of acoustic energy pulses;
   the respective first surfaces of said coupling means being of convex shape to provide substantially equal amounts of transit time to acoustic pulses traversing the distance in said coupling means from different locations on said respective first surfaces to said respective opposite second surfaces, and
   said respective convex shapes being curved also to cause acoustic signals provided by any one of said transducers and emanating from different locations along the respective first surfaces to be focused toward an area within the workpiece beyond the entrant surface thereof and toward a region in proximity to the central axis between said pair of coupling means.

6. A dual transducer probe as set forth in claim 5 wherein both of said convex surfaces are cylindrical sections, the rotational axis of such sections being disposed in proximity to said respective opposite second surfaces and in proximity to the central axis between said pair of coupling means.

7. A dual transducer probe for ultrasonic testing as set forth in claim 5 wherein both of said first surfaces are spherical sections, the center of such sphere being disposed in proximity to said second opposite surfaces and in proximity to the central axis between said pair of coupling means.

8. A dual transducer probe comprising in combination:

a pair of relatively elongated matching coupling means arranged in substantially parallel, juxtaposed and slightly spaced acoustically insulated relation, and each such means having a first end surface for supporting thereupon an electro-acoustic transducer and a second end surface, opposite said first end surface, arranged to be coupled to an entrant surface of a workpiece;

one of said coupling means constituting essentially a transmitter of ultrasonic energy and the other constituting a receiver of ultrasonic energy;

electro-acoustic transducers engaged respectively with each of said first end surfaces, said transducers adapted to act respectively as a transmitter and a receiver of acoustic energy pulses;

the first surface of the coupling means constituting essentially the transmitting means being curved to provide substantially equal amounts of transit time to acoustic pulses produced by said transmitting transducer and traversing said coupling means from different locations on said respective first surface to said opposite second surface, and causing the acoustic signals provided by the associated transducer and emanating from different locations along said respective first surface to be focused toward an area within the workpiece beyond the entrant surface thereof and toward a region in proximity to the central axis between said pair of coupling means.

References Cited

UNITED STATES PATENTS

| | | | |
|---|---|---|---|
| 2,913,602 | 11/1959 | Joy | 310—8.3 |
| 3,132,510 | 5/1964 | Buchan et al. | 73—67.7 |
| 3,228,234 | 1/1966 | Marklein | 73—67.8 |

SAMUEL FEINBERG, *Primary Examiner.*

BENJAMIN A. BORCHELT, *Examiner.*

P. A. SHANLEY, *Assistant Examiner.*